May 5, 1942. D. H. MONTGOMERY ET AL 2,281,706
TOOL HOLDER
Original Filed March 28, 1936
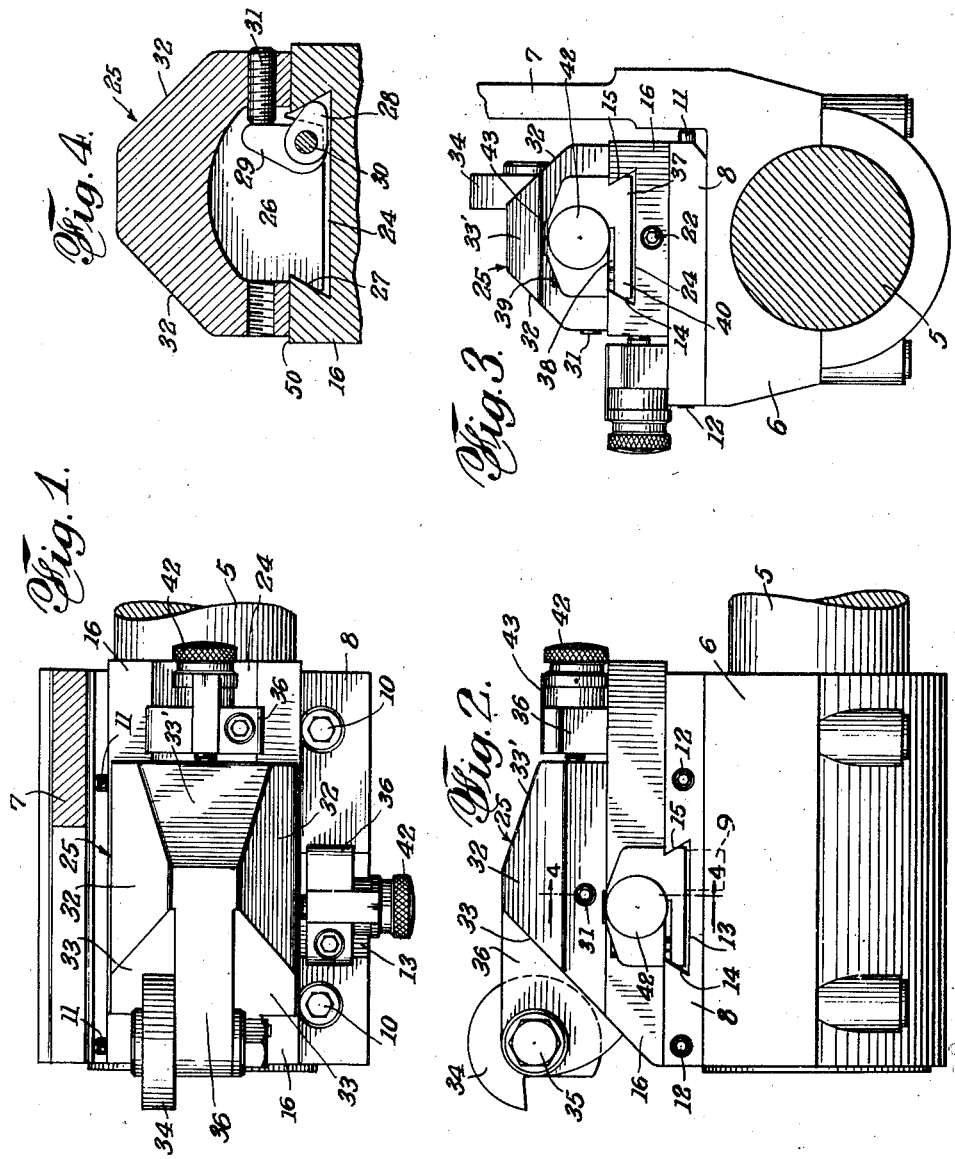
INVENTORS
DONALD H. MONTGOMERY
GEORGE A. CARDELL
BY
ATTORNEYS.

Patented May 5, 1942

2,281,706

UNITED STATES PATENT OFFICE 2,281,706

TOOL HOLDER

Donald H. Montgomery, West Hartford, and George A. Cardell, New Britain, Conn., assignors, by mesne assignments, to The New Britain Machine Company, New Britain, Conn., a corporation of Connecticut Original application March 28, 1936, Serial No. 71,428. Divided and this application September 23, 1939, Serial No. 296,230

1 Claim. (Cl. 82—36)

The invention relates to a tool holding device, and this application is a division of our co-pending application, Serial No. 71,428, filed March 28, 1936, now Patent No. 2,174,860, dated October 3, 1939.

As is well known chips often collect and wind around the tools and tool holders of metal working machines. It is frequently necessary to stop the machine for the purpose of freeing the tools, tool holders and slides of an accumulation of such chips.

It is an object of this invention to provide an improved form of tool holding device to reduce to a minimum the liability of the collection of chips thereon.

More specifically it is an object of the invention to provide a tool holder having downwardly sloping surfaces to induce chips falling thereon to slide off.

In the drawing which shows, for illustrative purposes only, a preferred form of the invention—

Fig. 1 is a top plan view of a tool holding device illustrative of the invention;

Fig. 2 is a side view of the tool holding device of Fig. 1;

Fig. 3 is a rear end view of the tool holding device shown in Figs. 1 and 2; and Fig. 4 is an enlarged fragmentary sectional view taken substantially in the plane of the line 4—4 of Fig. 2.

In the form shown 5 indicates a rigid bearing stud carried by the frame of the machine and serving as the slide support for a cross slide 6, all as is more fully set forth in Gridley et al. Patent No. 2,055,435, September 22, 1936. The cross slide 6 is fed on its stud 5 by cam means (not herein shown) and is guided against rotation on the stud 5 by means of an upstanding arm 7, having interengagement with the frame, not herein shown but illustrated in said Gridley et al Patent.

A base plate 8 rests on the cross slide 6 and in the form shown is pivoted thereto, as by means of a stud 9. The base plate 8 is rigidly held to the cross slide by means of screws 10—10, having a loose fit in the counterbored opening in the base plate 8, so that the latter may be adjusted angularly to a slight extent about the stud 9 as a pivot. In order to adjust the plate 8 angularly on the cross slide 6 the plate may be bored for the reception of a pair of adjusting pins, such as 11, which engage an upstanding part of the slide 6, as will be clear from Fig. 3. Headless screws 12, engaging a threaded opening in the base plate 8, serve to force the adjusting pins 11 into engagement with the slide 6 and accurately to determine the angular position of the base plate 8 on the cross slide, after which the screws 10 may be tightened up and the base 9 will then be securely held in its adjusted position on the slide 6.

The base plate 8 is provided with a dovetail slot 13, having undercut surfaces 14—15. A supplementary base plate 16 fits flatwise on the base plate 8 and is provided with parts to interfit with the slot 13 to securely hold the plate 16 in place, as is more fully set forth in the parent application aforesaid.

The plate 16 is provided on top with a dovetail groove 24 (Fig. 4), positioned at right angles to the slot 13 in the base 8 upon which it fits. A tool holder 25 fits flatwise on the slide 16 and is provided with a projection 26, having a dovetail surface 27 to interfit with the adjacent side of the dovetail slot 24. At the side opposite the surface 27 there is a clamping member including a clamping nose 28 and an ear 29, said members being pivoted on a pin 30 and adjustable by means of a clamping or adjusting screw 31. The tool holder 25 may thus be held very securely and rigidly but adjustably on the plate 16 by rocking the ear 29 to cause the nose 28 engaging beneath the undercut on plate 16 to draw or cam the tool holder 25 down on the plate 16.

The tool holder is generally slabbed off, as indicated at 32—32, on the sides and at 33 on the front and the surfaces of the plate are likewise slabbed off, so that there is little likelihood that chips will lodge upon the surface of the tool holder or the parts upon which it is carried. The rear top surface is also slabbed off at 33', to cause chips falling on such surface to slide off. The tool itself in the form shown is a circular forming tool 34, secured as by means of a bolt 35 to a forwardly projecting flange member 36 on the tool holder 25.

It will be seen that since the base plate 8 can be angularly adjusted the tool 34 carried thereby is also capable of angular adjustment. Furthermore, the tool 34 may be moved longitudinally of the work by reason of the dovetail connection between the plates 8 and 16, and the tool may be moved transversely of the work by means of the dovetail connection illustrated in Fig. 4. All of these movements are adjusting movements and are, of course, independent of the main feeding movement of the tool slide.

The parts may be very accurately adjusted by very simple means. The adjusting means, that is, for the slide 16 on the slide 8 and the tool holder 25 on the slide 16, may comprise an adjusting block 36, having a dovetail 37 to engage within the dovetail slot, such as 13 or 24. The lower portion of the adjusting block 36 may be slotted, as indicated at 38, and the screw 39 threaded into the lower portion 40 may serve to draw up on the portion 40 and adjustably but rigidly clamp the adjusting block 36 in place in the slot and adjacent to the tool holder or part to be adjusted. The adjusting block 36 carries an adjusting screw 41 and an adjusting thumb nut 42, the latter being held in adjusted rotative position by means of a spring finger 43, engaging in various notches in the periphery of the thumb nut 42, as will be understood.

The thumb nut 42 carries a projecting pin 44 mounted eccentrically therein and the screw 41 has an eccentric hole therein to slidably receive the pin 44. The thumb nut 42 is sustained against longitudinal movement by a transverse pin 45 engaging in a circumferential groove in the shank, so that when the thumb nut is turned it does not move longitudinally but by means of the eccentric pin 44 slidably fitting the hole in the screw 41 the latter is rotated and advanced or retracted for adjusting the position of the tool.

The tool holder 25 or the part to be adjusted may be moved to approximate position and very lightly tightened. The final adjustment may then be accomplished by securing the block 36 in approximate position and then turning the thumb nut 42 so as to cause the screw 41 to very slowly move the part, such as the tool holder, to be adjusted. When adjustment has been effected the tool holder is rigidly clamped in place by means of the clamping screw 31, as heretofore described. The adjustment for the plate 16 on the plate 8 may be identical with the adjusting means just described and no separate description thereof need be given.

Since the dovetail slots and dovetails are all preferably of the same size the various dovetails are interchangeable with the various dovetail slots and the various adjusting means are interchangeable and may be used in any of the dovetail slots.

After the parts have been once properly adjusted and it later becomes necessary to remove the tool for re-grinding, the adjustment need not be at all disturbed. The clamping screw 31 is merely backed off and the tool holder 35 carrying the tool 34 with it is simply rocked, that is, by raising the side where the screw 31 is located the tool holder will pivot on the plate 16 about the point 50 and the nose 28 will slip out of the dovetail slot 24. When the tool has been reground the tool holder may be replaced by rocking the same into place and by backing the tool holder into the adjusting screw 41 and then turning up on the clamping screw 31 it is assured that the tool holder will be in the same position it was in before removal.

It is to be understood that, aside from the adjusting nuts 42, all of the clamping screws, etc., are housed or not projecting, so that the device may be said to be in effect streamlined, so that chips will readily fall away from the tool and down into the chip pan.

While the invention has been described in considerable detail and a preferred form shown it is to be understood that various changes and modifications may be made within the scope of the invention as defined in the appended claim.

We claim:

In a device of the character indicated, a block of metal having a generally rectangular base, means for securing said base to a support, said block being of generally frusto-pyramidal form, a flange member integral with and projecting forwardly from the front flat side of said generally frusto-pyramidal block, the top of said flange being a substantial continuation of the top of said block, and means for securing a tool to said forwardly projecting flange.

DONALD H. MONTGOMERY.
GEORGE A. CARDELL.